United States Patent [19]

Lieberman

[11] Patent Number: 4,980,070

[45] Date of Patent: Dec. 25, 1990

[54] FLOATING OIL SEPARATOR AND PROCESS

[75] Inventor: Geoffrey A. Lieberman, Sheffield Lake, Ohio

[73] Assignee: Mayfran International Incorporated, Cleveland, Ohio

[21] Appl. No.: 408,190

[22] Filed: Sep. 15, 1989

[51] Int. Cl.$^5$ .............................................. C02F 1/40
[52] U.S. Cl. ..................................... 210/708; 210/800; 210/802; 210/256; 210/522; 210/DIG. 5
[58] Field of Search ................. 210/97, 256, 305, 307, 210/522, 800, 802, 804, 708, DIG. 5

[56] References Cited

U.S. PATENT DOCUMENTS

| | | | |
|---|---|---|---|
| 801,679 | 10/1905 | Niclausse et al. | 210/522 |
| 2,651,414 | 9/1953 | Lawson | 210/307 |
| 3,529,728 | 9/1970 | Middelbeck et al. | 210/522 |
| 3,912,533 | 10/1975 | Heyer | 127/13 |
| 4,064,054 | 12/1977 | Anderson et al. | 210/DIG. 5 |
| 4,132,645 | 1/1979 | Bottomley et al. | 210/104 |
| 4,132,651 | 1/1979 | deJong | 210/522 |
| 4,202,778 | 5/1980 | Middelbeck | 210/522 |
| 4,396,504 | 8/1983 | Tannehill | 210/86 |
| 4,722,800 | 2/1988 | Aymong | 210/802 |

OTHER PUBLICATIONS 2 pp. Advertisement by Edjetch Services, Inc. Entitled T.O.S.S. The Tramp Oil Separator System (Undated).
4 pp. Advertisement by Porter Systems, Div. of Production Chemicals, Inc. Entitled Sur Portable Tramp Oil Removal System (Undated).
2 pp. Advertisement by Porter Systems, Div. of Production Chemicals, Inc. Entitled the Eliminator Untrafiltration System (Undated).
3 pp. Advertisement by Hyde Products, Inc. Entitled Wastewarrior (Undated).

Primary Examiner—Richard V. Fisher
Assistant Examiner—Christopher Upton
Attorney, Agent, or Firm—Body, Vickers & Daniels

[57] ABSTRACT

Process equipment is provided enabling a plurality of non-soluble lower specific gravity oils to be more effectively separated and collected from an aqueous liquid medium. The equipment utilizes gravity flow to separately remove surface oil constituents according to relative specific gravity in combination with a coalescing medium permitting oil constituents dispersed in the liquid medium to also be removed and with oil collection taking place at multiple locations in said equipment. A method operating the equipment in such manner is also disclosed.

21 Claims, 1 Drawing Sheet

FLOATING OIL SEPARATOR AND PROCESS

BACKGROUND OF THE INVENTION

This invention relates generally to continuous physical removal of at least one non-soluble lower specific gravity oil from an aqueous liquid medium and more particularly to process equipment further enabling a plurality of such oil materials to be separated and collected in a more effective manner, including the method of operating such process equipment.

Various metalworking and metalforming processes which include broaching, grinding, milling, rolling, stamping and turning now employ liquid coolants and other treatment liquids frequently utilizing an aqueous medium. Such medium often comprises a physical mixture of one or more non-soluble lower specific gravity oils dispersed in water which can further include suspended solids from the particular metal being processed after being used. Process equipment is also known whereby certain suspended oils and the suspended solids can be physically separated from the various treatment liquids in a continous manner before any reuse or disposal. One type oil separation system for such purpose employs a multicompartment tank having an inlet side for sequential removal of solids and floating oil with a subsequent processing side to remove dispersed oils from the influent mixture. A floating skimmer device is provided on the inlet side to first pick up free floating tramp oils and with oil constituents that still remain dispersed in said liquid medium being next removed therefrom in an intermediate compartment by a combined action of coalescence and gravity. More particularly, a medium is therein employed which collects tiny oil particles dispersed in the liquid medium to form much larger droplets having sufficient buoyancy to break free and rise to the liquid surface for a single separation thereat by fixed gating means such as a weir device. The now clarified liquid medium is pumped into further tank compartments enabling removal of still remaining soluble organic materials by ultrafiltration before its discharge into conventional disposal means such as a sewer. A simpler known coolant and washwater recycling system employs a two compartment separator tank having an inlet side which contains the coalescing medium along with the floating skimmer device in an entrance compartment to effect a separation of the floating oil constituents thereat. A bag filter can also be employed in the inlet compartment to effect a further removal of any suspended solids in the liquid medium. Utilization of an oleophilic material for the coalescing medium is said to accelerate separation of oil and water phases in the liquid medium being treated so as to permit a single separation to take place in a much smaller tank than would be required by gravity action alone. Continuous passage of the now clarified liquid medium to an exit compartment is provided with first fixed weir means whereby the exiting liquid passes under said weir device and then proceeds over a second fixed weir device to the tank outlet means. Separator systems of this type are also reported to be used for disposal of the liquid medium after treatment into conventional waterways.

A still third known process equipment of this general type is said to remove free floating, dispersed and loosely emulsified tramp oils from metal working coolant reservoirs and parts washers. The dirty liquid medium is treated in a tank member divided into entrance, intermediate and exit compartments for continuous passage of the oil bearing aqueous liquid therethrough by action of associated liquid pumping means. A floating skimmer device in the dirty liquid reservoir collects surface tramp oil which is pumped to the entrance compartment of the separator tank wherein free floating oils, bio-slimes and solids settle out. Fixed gating means are provided at the exit end of said compartment enabling the liquid medium to overflow into an intermediate compartment section having a vertically slanted plate stack which removes dispersed and loosely emulsified tramp oils and settles finely dispersed suspended solids. The liquid medium passes from said intermediate compartment section under fixed gating means to an exit compartment section having adjustable gating means which enable overflow of the separated oils and bio-slimes into a suitable waste oil container. A fixed effluent discharge weir controls liquid level in the separator tank while additional gating means returns the cleaned liquid medium to its initial reservoir. Selling or recycling of the separated tramp oils is said to be possible by this equipment manufacturer.

Considerable need still remains for a more effective as well as individual separation of these oils from various aqueous treatment liquids to reduce new material purchases as well as to reduce environmental contamination. From the standpoint of reducing environmental contamination alone it has been reported that aromatic constituents commonly found in the petroleum hydrocarbons now being used in many metalworking and metalforming fluids are toxic to all organisms. The hydrocarbons are lyophilic and because they are not metabolized or excreted, tend to accumulate in the fatty tissues of mammals. Contamination of shellfish is particularly of concern because they are consumed in great quantities by humans. Large doses of these aromatic hydrocarbon compounds can be lethal while sublethal quantities can have a variety of physiological effects, including carcinogenicity. To still further illustrate such concern, the compound benzopyrene found in coal tar has already been proven by Ames test to produce cancer.

It is an object of the present invention, therefore, to provide improved means for continuous physical recovery of at least one non-soluble lower specific gravity oil from an aqueous liquid medium.

It is another object of the present invention to provide such improved recovery means whereby a plurality of oils having different specific gravities can be individually separated from the liquid medium and collected.

It is still another object of the invention to provide process equipment utilizing a single tank member wherein different specific gravity oils can be separately collected for either reuse or waste disposal.

A still further object of the invention is to provide such processing equipment in a manner so that oil having essentially the same specific gravity can be separated from the liquid medium and removed at multiple collection sites as well as permitting oil of dissimilar specific gravity to be similarly collected.

Another object of the invention is to provide such process equipment whereby oil floating on the surface of the entering liquid medium is first collected, then followed by collecting oil initially dispersed in said liquid medium, and still further followed by collecting any remaining oil floating on the liquid surface.

Still another object of the invention is to provide a novel method for the collection of oil material from an aqueous liquid medium.

These and other objects of the present invention will become more apparent upon considering the following detailed description for the present invention.

SUMMARY OF THE INVENTION

In general and in accordance with one aspect of the present invention, improved process equipment is provided for continuous collection of at least one non-soluble lower specific gravity oil from an aqueous liquid comprising in combination: (a) a tank member having multiple interconnected compartment sections for continuous passage of the oil bearing aqueous liquid therethrough by action of associated liquid pumping means, (b) the tank member including an entrance compartment section being provided with first adjustable gating means enabling oil floating on the liquid surface to flow by gravity into first collection means while the remaining liquid flows into an intermediate compartment section, (c) the intermediate compartment section including a coalescing medium whereby oil dispersed in the flowing liquid forms larger size droplets in said compartment which float to the liquid surface for removal thereby by second adjustable gating means operatively associated with second collection means while the remaining liquid continues to flow into an exit compartment section, and (d) the exit compartment section including third adjustable gating means operatively associated with third collection means so as to enable remaining surface oil to be separated from the moving liquid as it emerges from said tank. As can be appreciated, the provision of multiple surface oil collection sites in the tank member enables either oil having essentially the same specific gravity to be separated from the liquid medium as well as permitting oil of dissimilar specific gravity to be similarly collected. Various type already known coalescing media can be employed in the above defined tank member to include metal plates and oleophilic material for accelerated separation of any dispersed oil phase in the liquid medium.

In one preferred embodiment, the above defined process equipment enables continuous separate collection of a plurality of non-soluble low specific gravity petroleum oils from an aqueous liquid medium at different collection sites in the equipment. Gravity separation of the liquid medium occurs during such processing with not only all lower specific gravity oils eventually floating on the water surface but with the surface oil layers further separating according to relative specific gravity. Accordingly, a representative example further illustrating such equipment operation entails (a) a tank member having multiple interconnected compartment sections for continuous passage of petroleum oil bearing aqueous liquid therethrough by action of associated liquid pumping means, (b) the tank member being provided with first adjustable weir means enabling surface oil which includes at least one oil having a first specific gravity to overflow into first operatively associated collector means while the remaining liquid flows into an intermediate compartment section, (c) the intermediate compartment section including a medium whereby oil dispersed in the flowing liquid which includes at least one oil having a second specific gravity becomes coalesced to form larger size droplets in said compartment which float to the liquid surface for removal therein by second adjustable weir means permitting overflow of the floating oil into second operatively associated collector means while the remaining liquid continues to flow into an exit compartment section, and (d) the exit compartment section including third adjustable weir means operatively associated with third collector means so as to enable remaining surface oil to be separated by gravity flow from the moving liquid together with fixed weir means regulating liquid level in the tank member. The adjustable weir means being employed in the illustrated equipment provide entrance openings to the operatively associated collector means which can simply consist of trough-shaped members positioned in physical abutment with said weir devices. Additionally, such trough collectors can further be provided with exit openings permitting removal of the collected oil for either reuse as collected or after further recovery processing as well as suitable disposal. A still further structural orientation of the associated weir and collector means herein illustrated in a conventional open-top tank member having a rectangular configuration enables manual adjustment of the weir devices during process operation so as to more effectively separate a selected top surface oil layer. For such representative tank member configuration the associated weir and collector means also form enclosed containers disposed in the tank member so as to permit liquid flow thereunder and thereby regulate the direction of principal liquid flow in the equipment between the thereby interconnected compartment sections.

In still different aspects of the present invention in connection with representative equipment configurations, a conventional floating skimmer device can also be provided in the entrance compartment section of the tank member as a further means of removing surface oil from the entering liquid medium. Likewise, bag filters and still other already known filtering means can also be disposed in said entrance compartment section for the removal of solid contaminants from the entering liquid. It is also contemplated to employ known leveling means for the particular adjustable gating means found in the present equipment to assist in effecting a still more through removal and collection of the surface oils. Various conventional liquid pumping means can also be utilized with the illustrated process equipment to provide a continuous flow of the liquid medium during equipment operation. For example, suitable pumps include a progressive cavity pump, a venturi pump powered with a centrifugal pump, a venturi pump powered by an existing pump in the user's facility and a venturi pump powered by air. Known automated controls for equipment operation are also contemplated to include having fluid flow sensing elements control pump operation as well as further including customary on-off, time-delay and limit switches for the control of electrical power to the selected liquid pumps.

It will be further apparent from the foregoing description provided upon the present process equipment that a novel method for the collection of at least one non-soluble lower specific gravity oil from an aqueous liquid medium has also been disclosed. General operation of the above illustrated equipment in said regard comprises (a) introducing the oil bearing aqueous liquid by continuous flow into a tank member having multiple interconnected compartment sections by action of associated liquid pumping means, (b) collecting oil floating on the liquid surface by action of first adjustable gating means disposed in an entrance compartment section of the tank member while the remaining liquid flows into an intermediate compartment section of the tank member, (c) collecting oil dispersed in the flowing liquid by action of a coalescing medium disposed in the intermediate compartment section causing the dispersed oil to form larger size droplets which float to the surface and removing this surface oil by further action of second adjustable gating means disposed in said intermediate compartment section, and (d) collecting any remaining surface oil from the flowing liquid in an exit compartment section of the tank member by action of third adjustable gating means disposed therein while further causing the remaining liquid to emerge from the tank member. In accordance with such defined equipment operation, the collection of one or more surface oils at different locations in the tank member enables flexible re-use of the same equipment. Thus, a single metalworking or metalforming petroleum oil can be collected whether present in the aqueous liquid medium as a tramp surface layer or as a dispersed phase. Similarly, the separation and collection of a plurality of such petroleum oils having different specific gravities can also be carried out to include coolant oil and "way" oil being found in the same aqueous liquid medium being processed. It becomes still further possible with such method of equipment operation to effect multiple surface oil collection in a single compartment section of the tank member. To still further illustrate such variation in the above defined equipment operation, the provision of multiple adjustable gating means in a selected compartment section of the tank member along with associated collection means, such as providing such means at entrance and exit locations in the intermediate compartment section, enable dual collection of the surface oil therein.

DESCRIPTION OF THE PREFERRED EMBODIMENTS

Figure 1:
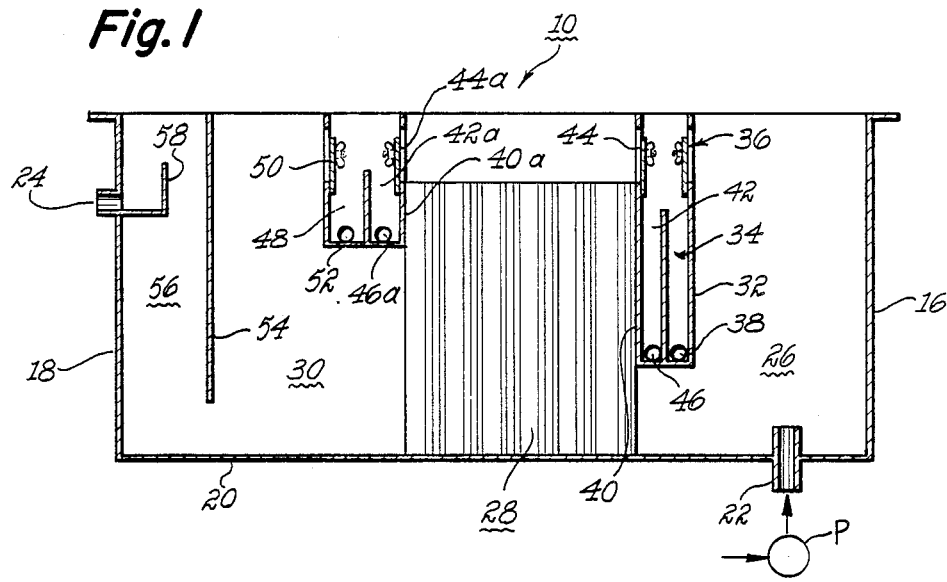
FIG. 1 comprises a longitudinal side view for a representative process equipment according to the present invention.

Referring now more specifically to the drawings, one preferred embodiment of the present invention is illustrated in connection with a suitable apparatus for conducting the improved oil collection. As shown in FIG. 1, there is illustrated a side view for an open-top tank member 10 wherein oil separation and collection proceeds according to the present invention. Accordingly, tank member 10 has a rectangular configuration formed by side walls 12 and 14, end walls 16 and 18 and a bottom wall 20, as can all better be seen by further reference to related FIG. 2. The tank member is further provided with a liquid input opening 22 at one end and a liquid exit opening 24 located at the opposite end. The mixed oils and aqueous liquid to be separated are introduced into tank member 10 through opening 22 such as by a pump P as schematically shown in FIG. 1. The tank member 10 is also divided into interconnected compartment sections 26, 28 and 30 by means of various baffling structures located within its central cavity to be further explained. Entrance compartment 26 is defined by one wall member 32 enclosing first surface oil collector means 34 while further permitting liquid flow thereunder. Surface oil is collected in the entrance compartment 26 by gravity flow over first adjustable weir means 36 which provides an entrance opening to the first collection means 34 while the collected oil emerges therefrom at exit opening 38. Intermediate compartment section 28 is defined at one end by wall member 40 enclosing second surface oil collector means 42 while the opposite end of said compartment is similarly defined with cooperating additional surface oil collector means 42a that are also enclosed by a wall member 40a. As can be seen in the drawing, both surface oil collection means 42 and 42a are operatively associated with adjustable weir means 44 and 44a, respectively, to enable surface oil collection by gravity flow at each end of the intermediate compartment section 28 while further permitting the flow of liquid thereunder. Exit openings 46 and 46a are provided to the respective surface oil collection means whereby the collected oil can be removed therefrom. Exit compartment section 30 is defined by tank end wall 18 and still further surface oil collection means 48, said collector means similarly including an opening thereto provided with adjustable weir means 50 along with an exit opening 52 for the recovery of the collected oil. Liquid flow proceeds in exit compartment section 30 under the surface oil collection means 48 and is still further regulated therein by flow under a fixed gating member 54. A sub-division of the exit compartment section 30 by such fixed baffing means enables relatively oil-free liquid to be transported to end portion 56 of the tank member with little risk of again becoming contaminated. The cleaned liquid is continuously removed from said end portion 56 via exit opening 24 after passage over additional fixed gating means 58 located therein for control of liquid level in the moving liquid.

Figure 2:
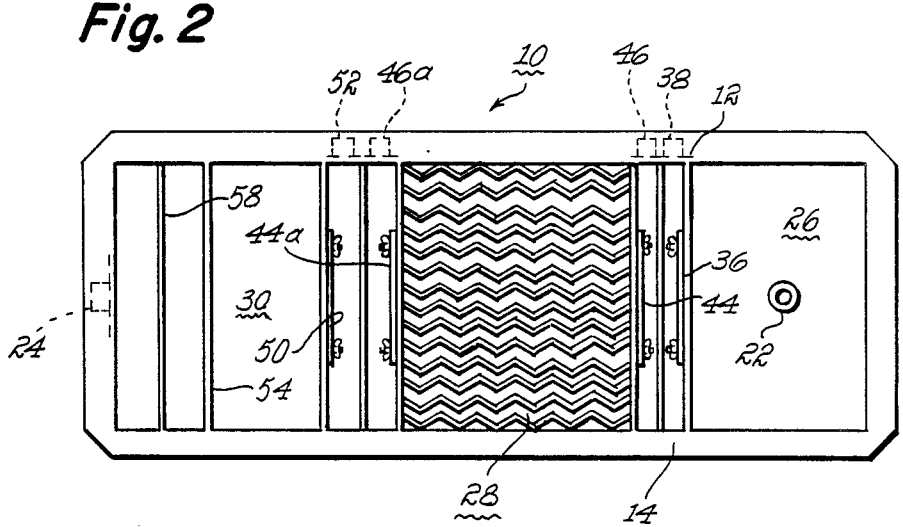
FIG. 2 is a top view depicting the equipment of FIG. 1.

In FIG. 2, there is depicted a top view of the tank member 10 to still further explain a typical structural arrangement for the principal features involved as well as to further explain typical operation of the incorporated adjustable gating devices. Accordingly, all baffling construction can be physically supported by side walls 12 and 24 of the tank member 10. The adjustable weir devices 36, 44, 44a and 50 are slidably joined to the previously indicated wall members enclosing the operatively associated collector means as can be seen. In this manner, a manual adjustment of these weir devices can be made by an operator during equipment operation without having to physically contact the particular liquid medium being processed. Such adjustment is enabled with conventional wing nuts (unnumbered) securing the respective weir plates to the supporting wall members. Still further optional utilization of leveling screws and the like is also contemplated for better control of weir plate height in the apparatus as an alternative procedure to loosening wing nuts.

It will be apparent from the foregoing description that a broadly useful improvement has been disclosed enabling more effective removal as well as recovery of at least one non-soluble lower specific gravity oil from such oil bearing aqueous liquid medium. It will also be apparent that modifications can be made in the specific method, process equipment and control means for suitable operation of such equipment as herein disclosed without departing from the spirit and scope of the present invention. For example, it is recognized that multiple oil collection means can be utilized in individual compartment sections of the tank member for still more extended removal of oil contamination. Additionally, it is recognized that certain or all of the collector troughs herein illustrated can be interconnected by conventional liquid conduit means such as when dealing with removal of a single oil contaminant from the aqueous liquid medium. Consequently, it is intended to limit the present invention only by the scope of the appended claims.

What I claim as new and desire to secure by Letters Patent of the United States is:

1. Process equipment for continuous collection of at least one non-soluble lower specific gravity oil from an aqueous liquid which comprises:
   (a) a tank member having multiple interconnected compartment sections for continuous passage of the oil and aqueous liquid therethrough,
   (b) the tank member including an entrance compartment section provided with first adjustable gating means enabling oil floating on the liquid surface in said entrance compartment section to flow by gravity into first collector means while the remaining liquid flows into an intermediate compartment section,
   (c) the intermediate compartment section including means for coalescing oil dispersed in the flowing liquid into droplets which float to the liquid surface in said intermediate compartment section, said intermediate compartment section including second adjustable gating means enabling oil floating on the liquid surface in said intermediate compartment section to flow by gravity into second collector means while the remaining liquid continues to flow into an exit compartment section,
   (d) the exit compartment section including an outlet for the liquid flowing through said tank member and third adjustable gating means enabling oil on the liquid surface in said exit compartment to flow by gravity into third collector means, and
   (e) means to introduce said oil and aqueous liquid into said entrance compartment section for flow through said tank member.

2. The process equipment of claim 1 wherein said intermediate compartment section includes a plurality of second adjustable gating means and a corresponding plurality of second collector means.

3. The process equipment of claim 1 wherein the adjustable gating means comprise weir devices.

4. The process equipment of claim 3 wherein leveling means are provided for the weir devices.

5. The process equipment of claim 1 wherein each said first, second and third collector means comprises a container having an entrance opening provided by the corresponding adjustable gating means and which containers are disposed in the tank member so as to permit liquid flow thereunder.

6. The process equipment of claim 5 wherein each said first, second and third collector means further includes a corresponding exit opening for removal of the collected oil.

7. The process equipment of claim 5 wherein the collector means are further provided with a top opening enabling adjustment of the adjustable gating means.

8. The process equipment of claim 1 wherein said means to introduce said oil and aqueous iquid into said entrance compartment section includes liquid pumping means.

9. The process equipment of claim 1 which further includes fixed gating means disposed in the exit compartment section to regulate liquid level in the tank member.

10. The process equipment of claim 1, wherein said means for coalescing oil includes coalescing plate means in said intermediate compartment section.

11. Process equipment for continuous collection of a plurality of non-soluble lower specific gravity petroleum oils from an aqueous liquid which comprises:
   (a) tank member having multiple interconnected compartment sections for continuous passage of the oils and aqueous liquid therethrough,
   (b) the tank member including an entrance compartment section provided with first adjustable weir means enabling a first surface oil having a first specific gravity to overflow by gravity into first collector means while the remaining liquid flows into an intermediate compartment section,
   (c) the intermediate compartment section including means for coalescing at least one oil in the flowing liquid having a second specific gravity into droplets in said intermediate compartment which float to the liquid surface to form a second surface oil for removal from said intermediate compartment section by second adjustable weir means permitting overflowing by gravity of the second surface oil into second collector means while the remaining liquid continues to flow into an exit compartment section,
   (d) the exit compartment including third adjustable weir means enabling remaining surface oil in said exit compartment section to overflow by gravity into third collector means, said exit compartment section further including fixed weir means regulating liquid level in the tank member, and
   (e) means to introduce said oils and aqueous liquid into said entrance compartment section for flow through said tank member.

12. The process equipment of claim 11 wherein said intermediate compartment section includes a plurality of second adjustable weir means and a corresponding plurality of second collector means.

13. The process equipment of claim 11 wherein each said first, second and third collector means comprises a container having an entrance opening provided by the corresponding adjustable weir and which containers are disposed in the tank member so as to permit liquid flow thereunder.

14. The process equipment of claim 11, wherein said means for coalescing oil includes coalescing plate means in said intermediate compartment section.

15. The process equipment of claim 11, wherein said means to introduce said oils and aqueous liquid into said entrance compartment section includes liquid pumping means.

16. A process for continuous collecting of at least one non-soluble lower specific gravity oil from an aqueous liquid medium which comprises:
   (a) introducing the oil and aqueous liquid by continuous flow into a tank member having multiple interconnected compartment sections,
   (b) collecting oil floating on the liquid surface by action of first adjustable weir means disposed in an entrance compartment section of the tank member while the remaining liquid flows into an intermediate compartment section of the tank member,
   (c) coalescing oil dispersed in the fowing liquid by action of a coalescing medium disposed in the intermediate compartment section causing the dispersed oil to form droplets which float to the surface in said intermediate compartment section, and collecting this surface oil by action of second adjsutable weir means disposed in said intermediate compartment section, and (d) collecting any remaining surface oil from the flowing liquid in an exit compartment section of the tank member by action of third adjustable weir means disposed therein while discharging the remaining liquid from said exit compartment section.

17. The process of claim 16 wherein the surface oil being collected is essentially of the same specific gravity.

18. The process of claim 16 wherein surface oils of dissimilar specific gravity are collected.

19. The process of claim 16 wherein liquid level in the tank member is regulated by fixed gating means.

20. A process for continuous collection of a plurality of non-soluble lower specific gravity oils from an aqueous liquid medium which comprises:

(a) introduing the oils and aqueous liquid by continuous flow into a tank member having interconnected multiple compartment sections, (b) collecting oil floating on the liquid surface which includes at least one oil having a first specific gravity by action of first adjustable weir means disposed in an entrance compartment section of the tank member while the remaining liquid flows into an intermediate compartment section of said tank member, (c) coalescing oil dispersed in the flowing liquid having a second specific gravity by action of a medium disposed in the intermediate compartment section causing the dispersed oil to form droplets which float to the surface in said intermediate compartment section, and collecting this surface oil by action of second adjustable weir means disposed in said intermediate compartment section, and (d) collecting any remaining surface oil from the flowing liquid in an exit compartment section of the tank member by action of third adjustable weir means disposed therein while discharging the remaining liquid from said exit compartment section after passage over fixed weir means regulating the liquid level in said tank member.

21. The process of claim 20 wherein oil collection in the intermediate compartment section is achieved with multiple second adjustable weir means and corresponding second collector means.

* * * * *